United States Patent
Geisberger

(10) Patent No.: US 8,413,509 B2
(45) Date of Patent: Apr. 9, 2013

(54) SPRING MEMBER FOR USE IN A MICROELECTROMECHANICAL SYSTEMS SENSOR

(75) Inventor: Aaron A. Geisberger, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1395 days.

(21) Appl. No.: 12/102,601

(22) Filed: Apr. 14, 2008

(65) Prior Publication Data

US 2009/0256297 A1 Oct. 15, 2009

(51) Int. Cl.
*G01P 15/125* (2006.01)
*G01P 15/08* (2006.01)

(52) U.S. Cl.
USPC ..................... 73/514.32; 73/514.38

(58) Field of Classification Search ............... 73/514.32, 73/514.36, 514.38, 514.29, 504.14, 504.12, 73/504.04
See application file for complete search history.

(56) References Cited

U.S. PATENT DOCUMENTS

| | | | |
|---|---|---|---|
| 5,760,455 A * | 6/1998 | Hierold et al. ................. | 257/415 |
| 6,228,275 B1 * | 5/2001 | Koch et al. ......................... | 216/2 |
| 6,321,654 B1 | 11/2001 | Robinson | |
| 6,401,536 B1 * | 6/2002 | O'Brien ..................... | 73/514.38 |
| 6,426,538 B1 | 7/2002 | Knowles | |
| 6,450,033 B1 * | 9/2002 | Ito et al. ...................... | 73/514.29 |
| 6,617,750 B2 | 9/2003 | Dummermuth et al. | |
| 6,806,991 B1 | 10/2004 | Sarkar et al. | |
| 7,024,933 B2 * | 4/2006 | Malametz ................... | 73/514.32 |
| 7,210,348 B2 * | 5/2007 | Tokunaga .................. | 73/504.12 |
| 7,268,463 B2 | 9/2007 | Li et al. | |
| 7,412,888 B2 * | 8/2008 | Chu et al. .................... | 73/514.32 |
| 7,628,072 B2 * | 12/2009 | Koury et al. ............... | 73/514.32 |
| 2005/0204816 A1 | 9/2005 | Tokunaga | |
| 2007/0193355 A1 | 8/2007 | Axelrod et al. | |

FOREIGN PATENT DOCUMENTS

| | | |
|---|---|---|
| EP | 1519149 A1 | 3/2005 |
| EP | 1018635 B1 | 3/2006 |
| JP | 2008058259 A | 3/2008 |

OTHER PUBLICATIONS

International Search Report and Written Opinion, Application No. PCT/US2009/034085, dated Jun. 29, 2009.

* cited by examiner

*Primary Examiner* — Helen C. Kwok
(74) *Attorney, Agent, or Firm* — Schmeiser, Olsen & Watts LLP; Lowell W. Gresham; Charlene R. Jacobsen

(57) ABSTRACT

A device (96) includes a microelectromechanical (MEMS) sensor (40). The sensor (40) includes a movable element (42) adapted for motion in a direction (44) and an anchor (46) coupled to a substrate (48). The MEMS sensor (40) further includes spring members (50) interconnected between the movable element (42) and the anchor (46). Each of the spring members (50) includes beams (56, 58, 60) arranged in substantially parallel alignment, with the beam (60) positioned between the other beams (56, 58). Each of the beams (56, 58) is coupled to the anchor (46) and the beam (60) is coupled to the movable element (42). Each of the spring members (50) further includes a support structure (64) joined with the beams (56, 58) to provide vertical stiffness to the beams (56, 58) of the spring member (50).

17 Claims, 4 Drawing Sheets

*PRIOR ART*

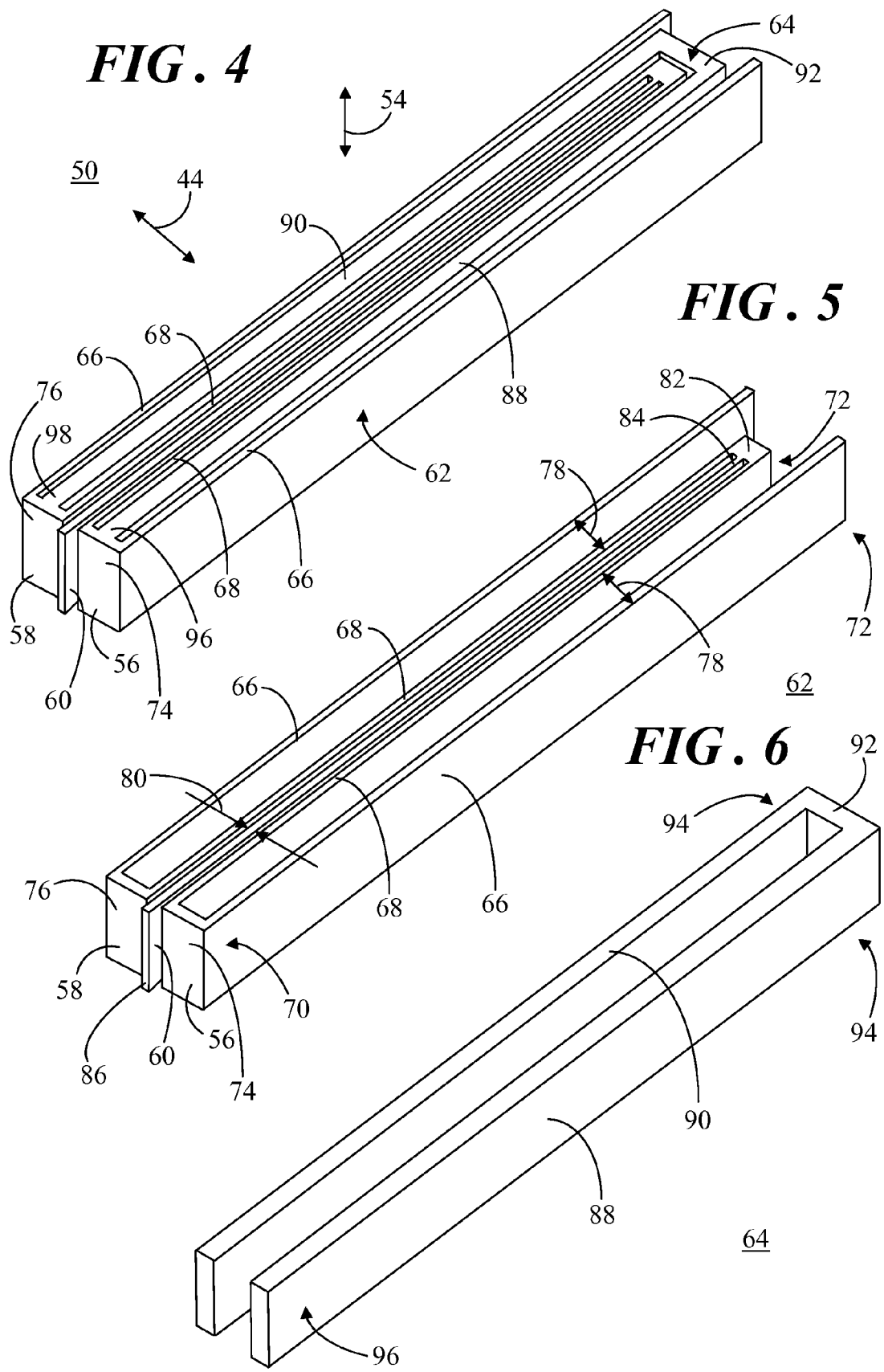

SPRING MEMBER FOR USE IN A MICROELECTROMECHANICAL SYSTEMS SENSOR

TECHNICAL FIELD OF THE INVENTION

The present invention relates generally to microelectromechanical systems (MEMS) sensors. More specifically, the present invention relates to a spring member for suspension of a movable element of a MEMS sensor.

BACKGROUND OF THE INVENTION

Many devices and systems include a number of different types of sensors that perform various monitoring and/or control functions. Advancements in micromachining and other microfabrication processes have led to the manufacturing of a wide variety of microelectromechanical systems (MEMS) sensors to perform these monitoring and/or control functions.

A MEMS sensor may be formed on a wafer that includes a substrate (also known as a handle layer), an insulating sacrificial layer of, for example, an oxide, overlying the substrate, and an active layer overlying the insulating layer. In general, a MEMS sensor typically includes a movable element, sometimes referred to as a proof mass, formed in the active layer. The movable element may be coupled to the substrate by a set of compliant members, also referred to as springs or flexures.

The compliant members typically suspend the movable element over the substrate in a neutral position. The neutral position may be parallel or not parallel to the coupled substrate. The compliant members function to keep the movable element in the neutral position until the selective application of force, due to some other means, causes a deflection thereof. Movement of the movable element deforms the compliant members, storing potential energy therein. The stored potential energy tends to return the movable element to its neutral position once the force is removed. By way of example, the movable element of a MEMS accelerometer moves when the MEMS accelerometer experiences acceleration. Motion of the movable element is converted via electronics into a signal having a parameter magnitude (e.g. voltage, current, frequency, etc.) that is dependent on the acceleration.

When designing MEMS sensors that call for low lateral stiffness (i.e., low stiffness in the intended direction of motion of the movable element), the compliant members typically employ a folded spring structure. FIG. 1 shows a top view of a prior art MEMS sensor 20. MEMS sensor 20 includes a movable element 22, distinguished in FIG. 1 by upwardly and rightwardly directed hatching. Movable element 22 is adapted for lateral motion in a direction 24. Anchors 26, distinguished in FIG. 1 by downwardly and rightwardly directed hatching, are coupled to an underlying substrate 28. MEMS sensor 20 further includes folded spring members 30 interconnected between anchors 26 and movable element 22. Anchors 26 and folded spring members 30 function to suspend movable element 22 above substrate 28. Lateral movement of movable element 22 in direction 24 may be detected by sense electrodes 32 proximate movable element 22, as known to those skilled in the art.

Unfortunately, folded spring members 30 are subject to twisting under high vertical loads such as mechanical shock in excess of, for example, 10 g, which can occur during testing and in use. Indeed, failures have occurred under such high vertical loads. For example, a vertical load (perpendicular to the plane view of MEMS sensor 20) applied at an attachment point 34 of folded spring member 30 with movable element 22 introduces a moment of force to folded spring member 30. The vertical load can result in twisting of folded spring members 30 at their attachment points 34 and/or at folds 36 of folded spring member 30. This twisting effectively reduces the vertical stiffness and can result in large vertical displacement of movable element 22. A problem with excessive vertical displacement is that movable element 22 can contact substrate 28 and stick to substrate 28, thus resulting in a MEMS sensor failure. This problem can be exacerbated in some folded spring designs due to asymmetries of the folded structures.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a perspective view of a spring member of the MEMS sensor of FIG. 2;

FIG. 5 shows a perspective view of a spring portion isolated from the spring member of FIG. 4;

FIG. 6 shows a perspective view of a Support structure isolated from the spring member of FIG. 4.

DETAILED DESCRIPTION

Figure 1:
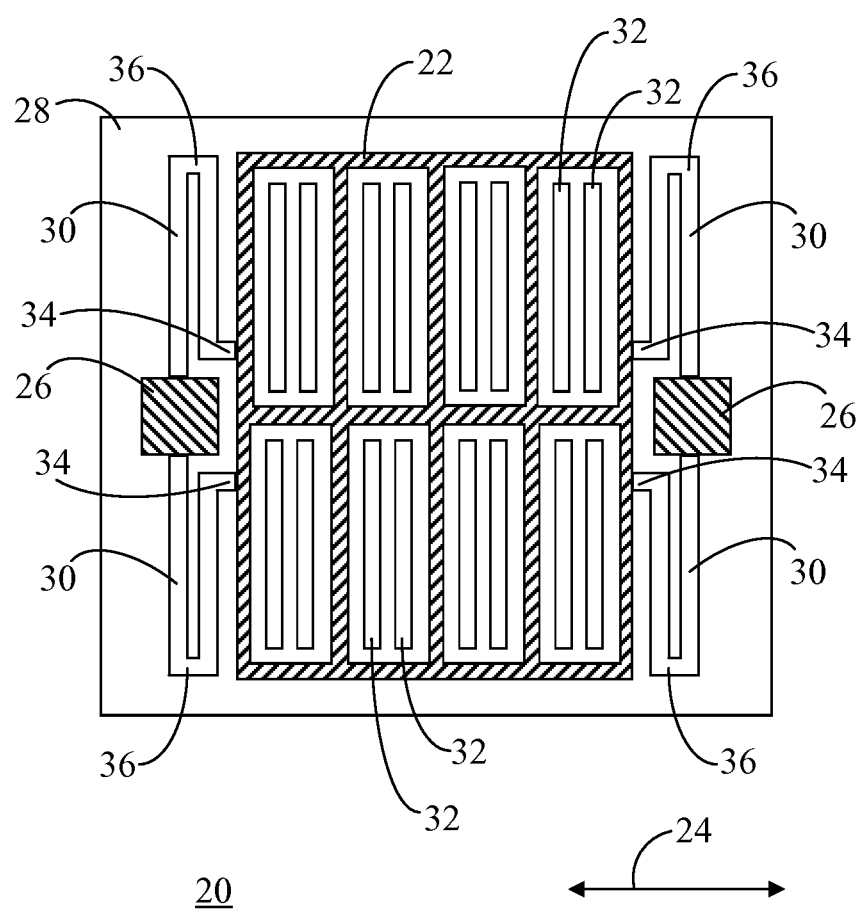
FIG. 1 shows a top view of a prior art microelectromechanical (MEMS) sensor.
Figure 2:
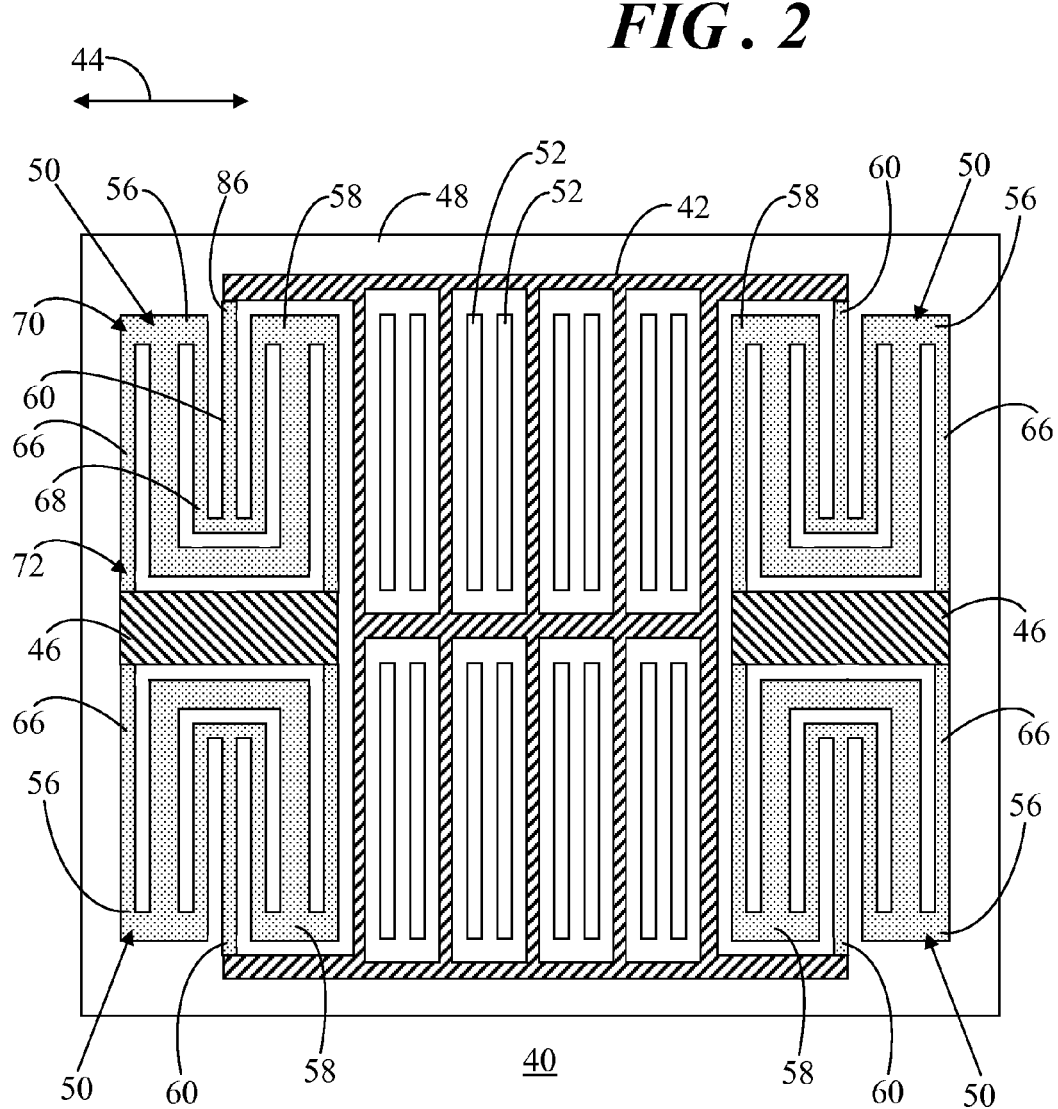
FIG. 2 shows a top view of a microelectromechanical (MEMS) sensor in accordance with an embodiment of the invention.
Figure 3:
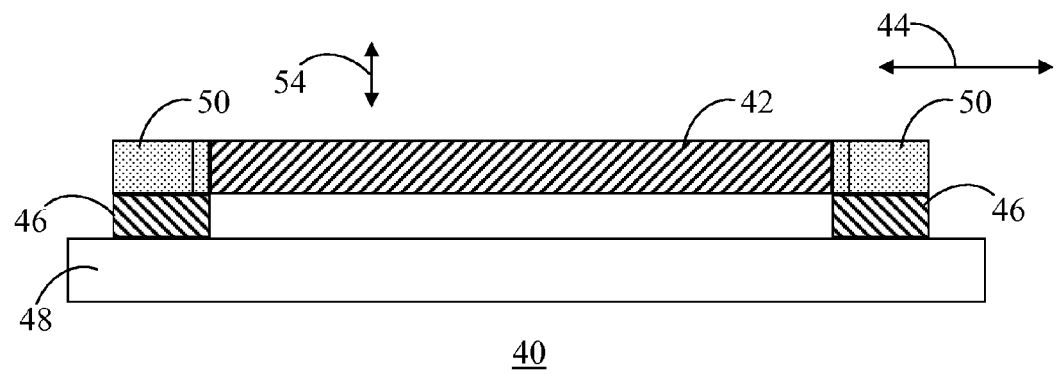
FIG. 3 shows a side view of the MEMS sensor of FIG. 2.

Referring to FIGS. 2-3, FIG. 2 shows a top view of a microelectromechanical (MEMS) sensor 40 in accordance with an embodiment of the invention, and FIG. 3 shows a side view of MEMS sensor 40. MEMS sensor 40 includes a movable element 42, distinguished in FIGS. 2 and 3 by upwardly and rightwardly directed hatching. Movable element 42 is adapted for motion in a lateral direction 44. Anchors 46, distinguished in FIGS. 2 and 3 by downwardly and rightwardly directed hatching, are coupled to an underlying substrate 48. MEMS sensor 40 further includes spring members 50, distinguished in FIGS. 2 and 3 by a dot pattern. Spring members 50 are interconnected between anchors 46 and movable element 42. Anchors 46 and spring members 50 function to suspend movable element 42 above substrate 48, as particularly illustrated in FIG. 3. Movement of movable element 42 in lateral direction 44 may be detected by sense electrodes 52 proximate movable element 42.

In this embodiment, spring members 50 are symmetrically disposed relative to movable element 42. In particular, MEMS sensor 40 includes four largely identical spring members 50 in which pairs of spring member 50 extend from opposites sides of anchors 46. This configuration suspends movable element 42 above substrate 48, and substantially parallel to a plane of substrate 48. However, movable element 42 is movable in lateral direction 44 which is also substantially parallel to the plane of substrate 48.

MEMS sensor 40 may be an accelerometer or another MEMS sensing device. In this example, MEMS sensor 40 may be a single axis accelerometer that is relatively flexible in lateral direction 44 but relatively stiff in a vertical direction 54. As will be discussed below, the design of spring elements 50 effectively prevents twisting at attachment points of spring members 50 in order to limit vertical displacement of movable element 42. As a consequence, the vertical stiffness of spring members 50 is increased, thereby limiting movement of movable element 42 in vertical direction 54. Limiting the vertical movement of movable element 42 can mitigate the problem of MEMS sensor 40 failure due to movable element 42 sticking to substrate 48.

In accordance with an embodiment of the present invention, each of spring members 50 includes a beam 56, a beam 58, and a beam 60, all of which are aligned in substantially parallel alignment. As shown, beam 60 is positioned between beams 56 and 58. In general, each of beams 56 and 58 is coupled to one of anchor 46 and movable element 42 and conversely, beam 60 is coupled to the other or anchor 46 and movable element 42. In this example, each of beams 56 and 58 is coupled to one of anchors 46, and beam 60 is coupled to movable element 42. However, in an alternative embodiment beams 56 and 58 may be coupled to movable element 42, while beam 60 may be coupled to one of anchors 46.

MEMS sensor 40 may be fabricated utilizing a number of known and upcoming MEMS fabrication processes including, for example, deposition, photolithography, etching, and so forth. In one example, a sacrificial layer (not shown) may be deposited on substrate 48. An active layer, such as a polysilicon, may then be deposited over the sacrificial layer as a blanket layer. The polysilicon active layer can then be patterned and etched to form the structures of MEMS sensor 40. Following patterning, the sacrificial layer is etched using known processes to release movable element 42 and spring members 50 from the underlying substrate 48. Accordingly, although spring members 50, and elements of spring members 50 (discussed below), are described variously as being "coupled to" and "attached to" other elements of MEMS sensor 40, it should be readily apparent that the terms "coupled to" and "attached to" refer to the physical connection of particular elements of MEMS sensor 40 that occurs during their formation through the patterning and etching process of MEMS fabrication. It should also be noted that spring members 50 and movable element 42 may be fabricated with through-holes (not shown for simplicity of illustration) that provide a passage for an etch material that may be used to release movable element 42 and spring members 50 from the underlying substrate 48.

Referring to FIGS. 4-6, FIG. 4 shows a perspective view of one of spring members 50 of MEMS sensor 40. FIG. 5 shows a perspective view of a spring portion 62 isolated from spring member 50, and FIG. 6 shows a perspective view of a generally U-shaped support structure 64 isolated from spring member 50. Each of spring members 50 includes an integrally formed spring portion 62 and support structure 64 in an interior of spring portion 62. The isolated views of spring portion 62 and structure 64 are provided so that the elements of each of spring portion 62 and support structure 64 can be more clearly visualized. The ensuing discussion describes one of spring members 50. However, it should be understood that the description of a single spring member 50 applies equivalently to all spring members 50 of MEMS sensor 40.

In one embodiment, each of beams 56 and 58 exhibits the same dimensional design (i.e., width 78 and a longitudinal length) and beam 60 exhibits a dimensional design (i.e., width 80 and/or a longitudinal length) that differs from the dimensional design of beams 56 and 58. The different dimensional design of beam 60 relative to the dimensional design of beams 56 and 58 results in a different lateral stiffness (in direction 44) of beam 60 relative to the lateral stiffness (in direction 44) of beams 56 and 58. In the illustrated embodiment, beam 60 has a lateral stiffness that is substantially less than that of beams 56 and 58 since width 60 of beam 60 is less than width 78 of each of beams 56 and 58. In another embodiment, width 80 of beam 60 may be greater than width 78 of each of beams 56 and 58 so that beam 60 will have greater lateral stiffness than that of beams 56 and 58. In either instance, the result of the differing lateral stiffness is to produce the appropriate compliance between beams 56, 58, and 60 of spring member 50.

As mentioned above in connection with FIGS. 3 and 4, each of spring members 50 includes substantially parallel beams 56, 58, and 60, with beam 60 being positioned between beams 56 and 58. These beams 56, 58, and 60 form the basis of spring portion 62. As most readily seen in FIG. 5, each of beams 56 and 58 includes a pair of elongated side walls, i.e., an outer side wall 66 and an inner side wall 68 spaced apart from side wall 66. Each of beams 56 and 58 further includes opposing ends 70 and 72. An end wall 74 spans between side walls 66 and 68 at end 70 of beam 56. Likewise, an end wall 76 spans between side walls 66 and 68 at end 70 of beam 58. The thickness of side walls 66 and 68 combined with the length of respective end walls 74 and 76 defines a width 78 of each of beams 56 and 58. Beam 60 also exhibits a width 80 that is substantially less than width 66.

Referring briefly to FIG. 2, end 72 of side wall 66 of each of beams 56 and 58 is attached to anchor 46. However, end 70 of each of beams 56 and 58 is not. Rather, beams 56 and 58 are cantilever beams in which one end, i.e., end 72, is coupled to anchor 46 and end 70 is free.

End 72 of side wall 68 of each of beams 56 and 58 is not coupled to anchor 46 either. Rather, and with reference back to FIG. 5, ends 72 of side wall 68 of each of beams 56 and 58 are coupled to one another, as well as to beam 60. In particular, spring portion 62 further includes a reinforcing region 82. Ends 72 of side walls 68 of each of beams 56 and 58 attach to one another at reinforcing region 82. In addition, an end 84 of beam 60 attaches to reinforcing region 82. However, an opposing end 86 of beam 60 couples to movable element 42 (see FIG. 2).

The spaced apart side walls 66 and 68 of spring portion 62 provides space for support structure 64. As most readily seen in FIG. 6, support structure 64 includes a leg 88 and a leg 90. A span member 92 is coupled between corresponding ends 94 of legs 88 and 90. In general, leg 88 is positioned proximate one longitudinal side of beam 60 and leg 90 is positioned proximate the opposing longitudinal side of beam 60. More particularly and as best seen in FIG. 4, leg 88 of support structure 64 is positioned between side walls 66 and 68 of beam 56 with its opposing end 96 coupled to end wall 74. Likewise, leg 90 of support structure 64 is positioned between side walls 66 and 58 of beam 58 with its opposing end 98 coupled to end wall 76. Accordingly, legs 88 and 90 are cantilevered from respective end walls 74 and 76 of beams 56 and 58, such that span member 92 forms a free end of support structure 64.

The configuration of beams 56, 58, and 60 of spring portion 62 yields a relatively low lateral stiffness so that they readily deflect in lateral direction 44 from a neutral position in response to motion of movable element 42 (FIG. 2). That is, movement of movable element 42 deforms spring portion 62 in lateral direction 44, storing potential energy in spring member 50. In addition, support structure 64 also moves with the movement of spring portion 62. The stored potential energy in spring member 50 tends to return movable element 42 to its neutral position once the force is removed.

Support structure 64 symmetrically bridges beams 56, 58, and 60 of spring portion 62 and attaches to spring portion 62 at only two locations on spring portion 62. The symmetrical bridging and two attachment locations largely prevents the individually flexible beams 56 and 58 from twisting during vertical loading. That is, torsional stiffness is achieved at ends 96 where support structure 64 attaches to end walls 74 and 76 of spring portion 62. The torsional stiffness effectively increases vertical stiffness in order to resist twisting in response to vertical load 54 that might otherwise occur at the attachment points of end walls 74 and 76 of beams 56 and 58 to anchor 46 and/or at the single attachment point of beam 60 to movable element 42.

Figure 7:
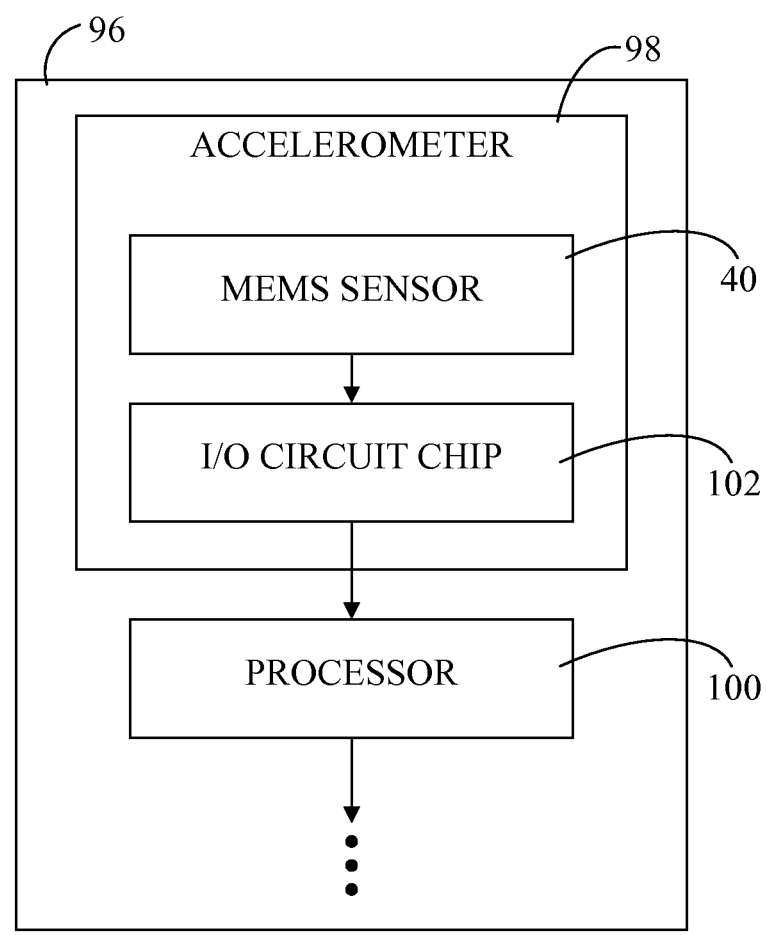
FIG. 7 shows a device in which the MEMS sensor of FIG. 2 may be included.

FIG. 7 shows a device 96 in which MEMS sensor 40 may be installed. Device 96 can be any of a number of devices such as a vehicle dynamic control system, an inertial guidance system, an airbag deployment system in a vehicle, a protection system for a variety of devices, and many other scientific and engineering systems. MEMS sensor 40 may be a single axis accelerometer capable of sensing acceleration in lateral direction 44 (FIG. 2), and is well suited for low-acceleration applications, e.g., less then 10 g, which can fail when subjected to mechanical shock at levels of, for example 25,000 g.

Device 96 may include an accelerometer package 98 into which MEMS sensor 40 is incorporated. In this exemplary situation, accelerometer package 98 is in communication with a circuit 100, which may include, for example, a processor, hard disk drive, and other components that are interconnected via conventional bus structures known to those skilled in the art. Those skilled in the art will recognize that device 96 may include many other components that are not discussed herein for brevity. Furthermore, device 96 need not have the structures specified herein. In this example, circuit 100 monitors signals from accelerometer package 98. These signals can include acceleration in lateral direction 44 (FIG. 2). An acceleration signal output from MEMS sensor 40 is communicated to a sense circuit of an input/output circuit chip 102 for suitable processing, as known to those skilled in the art, prior to output to circuit 100. The acceleration signal has a parameter magnitude (e.g. voltage, current, frequency, etc.) that is dependent on the acceleration.

An embodiment described herein comprises a device that includes a microelectromechanical (MEMS) sensor. The MEMS sensor includes spring members, or flexures, that support a movable element above a substrate. Each of the spring members is a symmetric design with a support structure that symmetrically bridges the beams of the spring portion of the spring member. The parallel configuration of the beams and the inclusion of the support structure effectively resists torsion due to vertical loading. Thus, a spring design for a MEMS sensor is achieved that is sufficiently compliant in the measurement direction, but is relatively stiff in the vertical direction. This stiffness largely prevents vertical motion of the attached movable element so as to mitigate the problem of MEMS sensor failure.

Although the preferred embodiments of the invention have been illustrated and described in detail, it will be readily apparent to those skilled in the art that various modifications may be made therein without departing from the spirit of the invention or from the scope of the appended claims. For example, MEMS sensor may be adapted to include a different number of anchors and/or a different number of spring members then that which is shown. In addition, the movable element can take on various other shapes and sizes then that which is shown.

What is claimed is:
1. A device comprising:
a microelectromechanical systems (MEMS) sensor, said sensor comprising:
a movable element adapted for motion in a first direction;
an anchor coupled to a substrate; and
spring members interconnected between said movable element and said anchor, each of said spring members comprising:
a first beam;
a second beam, each of said first and second beams being coupled to one of said anchor and said movable element, said each of said first and second beams including a pair of elongated side walls;
a third beam positioned between said first and second beams and coupled to another of said anchor and said movable element, said first, second, and third beams being arranged in substantially parallel alignment; and
a support structure having a first leg, a second leg, and a span member coupled between corresponding ends of said first and second legs, said first and second legs being located proximate opposing longitudinal sides of said third beam, wherein said first leg is positioned between said pair of side walls of said first beam, said first leg is cantilevered from a first end wall spanning between said pair of side walls of said first beam, said second leg is positioned between said pair of sidewalls of said second beam, and said second leg is cantilevered from a second end wall spanning between said pair of side walls of said second beam.

2. A device as claimed in claim 1 wherein each of said spring members is relatively flexible in said first direction and relatively stiff in a second direction.

3. A device as claimed in claim 1 wherein each of said first and second beams is a cantilever beam having a first end coupled to said one of said anchor and said movable element and a second end that is free.

4. A device as claimed in claim 1 wherein said each of said first and second beams exhibits a first dimensional design, and said third beam exhibits a second dimensional design that differs from said first dimensional design.

5. A device as claimed in claim 1 wherein said each of said first and second beams exhibits a first width and said third beam exhibits a second width, said second width being less than said first width.

6. A device as claimed in claim 1 wherein said span member is a free end of said support structure.

7. A device as claimed in claim 1 wherein said pair of elongated sidewalls of said each of said first and second beams comprises a first side wall and a second side wall spaced apart from said first side wall, said first side wall being attached to said one of said anchor and said movable element, and said second side wall of said each of said first and second beams being connected to one another and to said third beam.

8. A device as claimed in claim 7 wherein said each of said spring members comprises a reinforcing region, said second side walls of said first and second beams connect to one another via said reinforcing region, a first end of said third beam connects to said reinforcing region, and a second end of said third beam attaches to said another of said anchor and said movable element.

9. A device as claimed in claim 1 wherein said MEMS sensor comprises an accelerometer for detecting acceleration in said first direction, said movable element moving in response to said acceleration in said first direction.

10. A device as claimed in claim 9 wherein said accelerometer detects said acceleration of less than 10 g in said first direction.

11. A device as claimed in claim 1 wherein said spring members support said movable element disposed above and aligned substantially parallel to a plane of said substrate, and said first direction is substantially parallel to said substrate.

12. A microelectromechanical systems (MEMS) sensor, said sensor comprising:
a movable element adapted for motion in a first direction;
an anchor coupled to a substrate; and
spring members interconnected between said movable element and said anchor, each of said spring members comprising:
a first beam exhibiting a first width;
a second beam exhibiting said first width, each of said first and second beams being coupled to one of said anchor and said movable element, and said each of said first and second beams including a first side wall and a second side wall;
a third beam positioned between said first and second beams, said third beam exhibiting a second width that is less than said first width, said third beam coupled to another of said anchor and said movable element, said first, second, and third beams being arranged in substantially parallel alignment; and
a support structure having a first leg, a second leg, and a span member coupled between corresponding ends of said first and second legs, wherein said first leg is positioned between said first and second side walls of said first beam, said first leg is cantilevered from a first end wall spanning between said first and second side walls of said first beam, said second leg is positioned between said first and second side walls of said second beam, and said second leg is cantilevered from a second end wall spanning between said first and second side walls of said second beam.

13. A MEMS sensor as claimed in claim 12 wherein said each of said first and second beams is a cantilever beam having a first end coupled to said one of said anchor and said movable element and a second end that is free.

14. A MEMS sensor as claimed in claim 12 wherein said span member is a free end of said support structure.

15. A MEMS sensor as claimed in claim 12 wherein:
said first side wall of said each of said first and second beams is attached to said one of said anchor and said movable element;
said each of said spring members comprises a reinforcing region, said second side wall of said each of said first and second beams are connected to one another via said reinforcing region; and
said third beam includes a first end connected to said reinforcing region and a second end attached to said another of said anchor and said movable element.

16. A microelectromechanical systems (MEMS) sensor comprising:
a movable element adapted for motion in a first direction;
an anchor coupled to a substrate; and
spring members interconnected between said movable element and said anchor, each of said spring members comprising:
a first cantilever beam;
a second cantilever beam, each of said first and second cantilever beams having a first side wall and a second side wall spaced apart from said first side wall, said first side wall of said each of said first and second beams is coupled to one of said anchor and said movable element, each of said first and second beams having a free end, wherein said first beam includes a first end wall spanning between said first and second side walls of said first beam and said second beam includes a second end wall spanning between said first and second side walls of said second beam;
a third beam positioned between said first and second beams, said first, second, and third beams being arranged in substantially parallel alignment, and said third beam being coupled to another of said anchor and said movable element, said second side walls of said each of said first and second beams being connected to one another and to said third beam; and
a support structure having a first leg, a second leg, and a span member coupled between corresponding ends of said first and second legs, said first leg being positioned between said first and second side walls of said first beam and cantilevered from said first end wall, said second leg being positioned between said first and second of side walls of said second beam and cantilevered from said second end wall, and said span member is a free end of said support structure.

17. A MEMS sensor as claimed in claim 16 wherein said each of said spring members comprises a reinforcing region, said second side walls of said first and second beams connect to one another via said reinforcing region, a first end of said third beam connects to said reinforcing region, and a second end of said third beam attaches to said another of said anchor and said movable element.

* * * * *